T. J. BROWN.
Horse Hoe and Cultivator.

No. 201,645. Patented March 26, 1878.

WITNESSES:
Henry N. Miller
C. Sedgwick

INVENTOR:
T. J. Brown
BY Munn & Co
ATTORNEYS.

UNITED STATES PATENT OFFICE.

THOMAS J. BROWN, OF FAIRFIELD, TEXAS.

IMPROVEMENT IN HORSE HOES AND CULTIVATORS.

Specification forming part of Letters Patent No. 201,645, dated March 26, 1878; application filed January 18, 1878.

*To all whom it may concern:*

Figure 1:
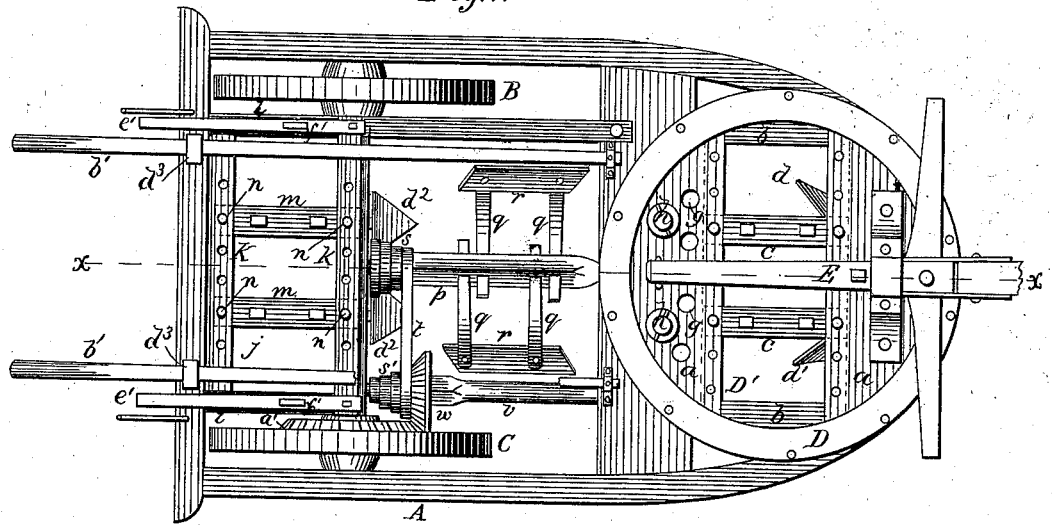
Figure 2:
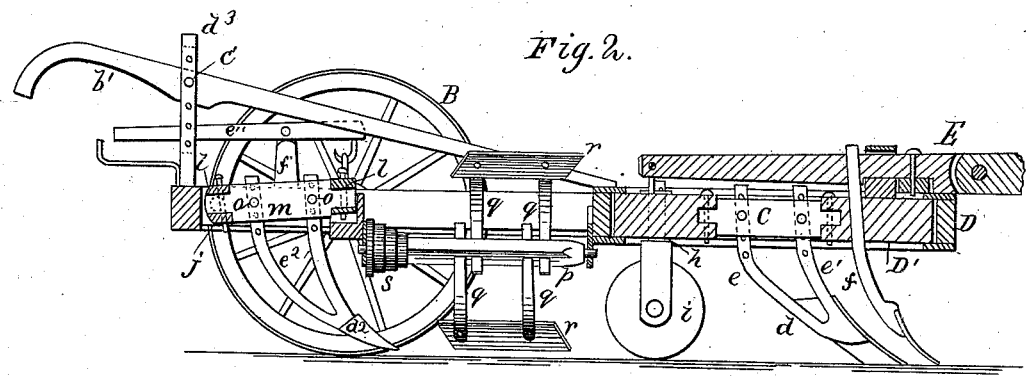

Be it known that I, THOMAS JEFFERSON BROWN, of Fairfield, in the county of Freestone and State of Texas, have invented a new and Improved Horse Hoe and Cultivator, of which the following is a specification:

Figure 1 is a plan view of my improved horse hoe and cultivator. Fig. 2 is a longitudinal section taken on line $x\ x$ in Fig. 1.

My invention relates to that class of agricultural implements employed in hoeing and cultivating crops of various kinds; and it consists in a circular frame, supported in suitable guides in the main frame, and carrying plows and rollers or caster-wheels, and having attached to it the tongue, by which the machine is guided and drawn forward.

The invention further consists in a frame carrying plows, which is hinged at its rear to the rear end of a wheeled carriage and lifted at its front by levers.

Similar letters of reference indicate corresponding parts.

Referring to the drawing, A is a frame, the rear end of which is supported by wheels B C. In the forward part of the frame there is a circular support, D, for receiving the circular frame D', consisting of the two segmental pieces $a$, which are grooved along the straight edges for receiving the bars $b$, by which the two portions are connected, and for receiving the bars $c\ c$, to which are attached the right and left hand plows $d\ d^1$. The plows are provided with double shanks $e\ e'$, in which there are several holes for receiving the bolts by which they are secured at different heights in mortises in the bars $c$.

The bars $c$ are held in different positions in the frame D' by bolts that pass through the segmental pieces $a$ and through the ends of the bars.

The tongue E is attached to the frame D', and a plow is supported under the frame, on the center line of the machine, by a shank, $f$, that extends upward through the frame D' and through the tongue.

Three holes, $g$, are made in the frame D', on each side of the tongue, in one of which, on each side of the center line of the machine, the shank $h$ of the support of the caster-wheel $i$ is placed. These caster-wheels are placed behind the right and left hand plows $d\ d^1$.

At the rear of the frame A a frame, $j$, is pivoted. This frame consists of end pieces $l$ and grooved side pieces $k$. To the latter bars $m$ are fitted, which are held in any desired position in the frame $j$ by pins $n$.

Plows $d^2$, having double shanks $e\ e'$, are fitted to mortises in the bars $m$, and secured in place by bolts O, that pass through the bars $m$ and through holes in the shanks.

The plows $d^2$ may be either straight or right and left hand. They are placed the same distance apart as the plows $d\ d^1$.

Between the circular support D' and the adjustable frame $j$ a shaft, $p$, is journaled in boxes attached to cross-bars of the frame A. From opposite sides of this shaft two arms, $q$, project, for carrying the hoe-blades $r$, which are inclined or pitched forward, forming an angle of about forty-five degrees with the arms $q$.

Upon the shaft $p$ there is a cone-pulley, $s$, which takes motion through a belt, $t$, from a cone-pulley, $s'$, on the shaft $v$, which is journaled in the frame A, parallel to the shaft $p$, and has secured to it a bevel-pinion, $w$, which meshes with a bevel-wheel, $a'$, attached to the wheel C.

The machine is provided with two handles, $b'$, which are adjustable as to height, being supported by a bolt, $c'$, that may pass through either of the holes in the standard $d^3$ and through the handle.

The frame $j$, carrying the plows $d^2$, is moved by levers $e''$ fulcrumed in standards $f'$, that project from the side pieces of the frame A.

As the machine is drawn forward the circular frame, being free to turn in its support, moves with the tongue, and the blades are rotated for chopping out, at regular intervals, a row of cotton or other plants, the machine in this instance straddling the row. The machine may also be drawn between the two rows of plants, for moving the dirt toward the same.

The machine is provided with two sets of plows, one set being large, for working in light soil, and the other set being small, for working in hard earth.

Having thus fully described my invention, I claim as new and desire to secure by Letters Patent—

1. The rotating circular plow-supporting frame D', for supporting the forward plows of the cultivator, in combination with the frame A, as herein shown and described.

2. The rotating frame D', with tongue E rigidly secured thereto, and provided with sliding mortised bars $c$, for receiving the plow-shanks, and having adjustable caster-wheels $i$, substantially as herein shown and described.

3. The pivoted frame $j$, having movable bars $m$ for supporting the rear plows, in combination with the main frame A, substantially as herein shown and described.

THOMAS JEFFERSON BROWN.

Witnesses:
W. T. WATSON,
W. B. IRBY.